Nov. 1, 1927.

K. F. GALLIMORE

CHUCK

Filed Aug. 13, 1923

Inventor
Keith F. Gallimore
By Chindale Parker Carlson
Attys

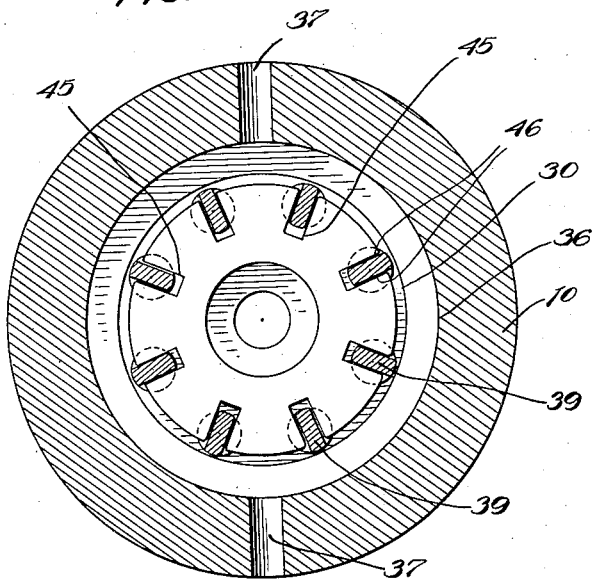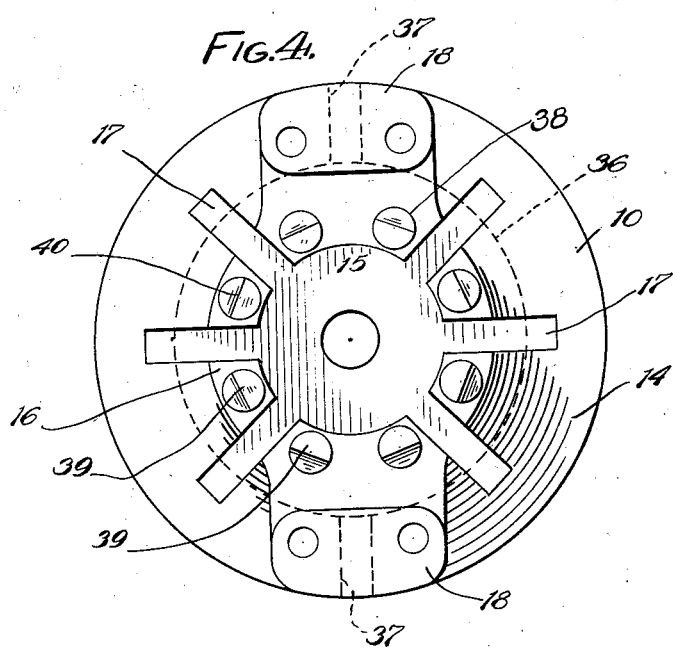

Patented Nov. 1, 1927.

1,647,220

UNITED STATES PATENT OFFICE.

KEITH F. GALLIMORE, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS.

CHUCK.

Application filed August 13, 1923. Serial No. 657,034.

The invention relates generally to devices for holding objects during metal removing operations, and has particular reference to chucks for precision work which are adapted for use with internal grinding machines.

One of the objects of the invention is to provide a work chuck for quantity production into or from which work blanks can be easily and quickly inserted or removed, and in which the work blanks can be accurately and quickly centered with respect to the axis of the chuck, thereby resulting in increased speed and precision of operation.

The work blanks to be chucked are seldom brought to the machine in a perfectly round condition due to initial irregularities in their surfaces, to indifferent or imperfect work in the prior machine operations, or if the blanks are composed of hardened steel to the distortion or warping resulting in the heat treatment process through which the blanks are first passed. Work blanks in the above condition having internal bores to be ground or machined are easily distorted in shape by being gripped on their uneven peripheral surfaces in the ordinary chucks comprising three or more jaws. Another object therefore is to provide a work chuck in which the blank is held firmly in place by means of end pressure alone, thereby avoiding the distortion of the walls of the blank, which commonly results in ordinary chucks due to the uneven bearing pressure to which the walls are subjected.

A further object is to provide a chuck in which the end pressure for holding the blank in place is uniformly applied, thereby enabling blanks of very small cross section or with exceptionally thin walls to be operated upon without being distorted or deformed.

In quantity production, the ends of the work blanks may have numerous burs formed thereon or may be battered and uneven due to rough handling before hardening, or said ends may be non-parallel due to inaccurate machining. Obviously if the elements of the clamping means grip the end of the blank without making allowances for such irregularities, the bearing pressure will be unequally distributed and may produce a clamping effect insufficient to prevent the blank from moving out of center during the following machine operation. An important object therefore is to provide a chuck having clamping means capable of compensating for varying thicknesses of the blank or for unevenness in the end surfaces thereof, whereby a uniform end pressure is obtained.

Another object is to provide a chuck for precision work which is sturdy and simple in construction, and which can be readily taken apart for cleaning, oiling, or changing of parts.

Further objects and advantages will become apparent as the description proceeds.

In the accompanying drawings, Figure 1 is a front view of a work chuck embodying the features of my invention.

Fig. 3 is a sectional view taken along line 3—3 of Fig. 2.

Fig. 4 is a front view of the chuck with the front plate removed.

Figure 1:
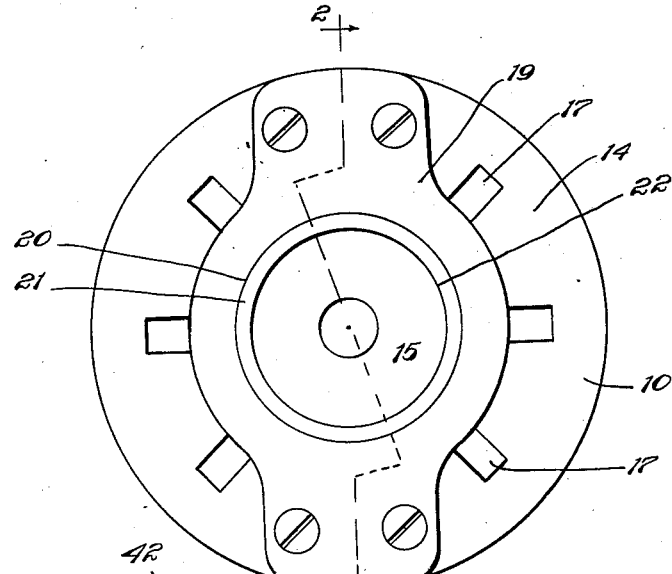
Figure 2:
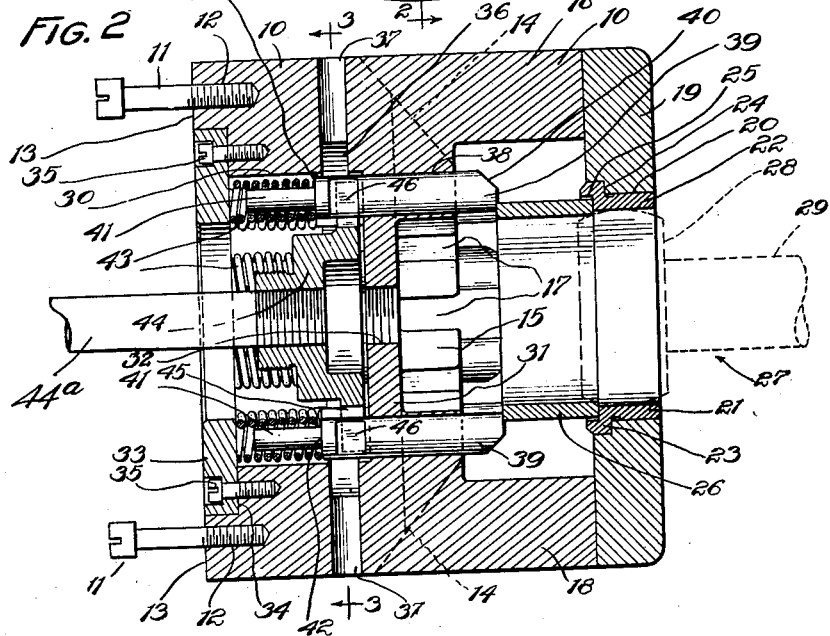
Fig. 2 is a sectional view taken along line 2—2 of Fig. 1, and showing a work blank clamped in position.

While my invention is susceptible of various modifications and alternative constructions, I have illustrated in the drawings and will herein describe in detail the preferred embodiment, but it is to be understood that I do not thereby intend to limit the invention to the specific construction disclosed but aim to cover in the subjoined claims all legitimate modifications and alternative constructions falling within the spirit and scope of the invention.

Referring to the drawings, 10 represents the body of the chuck which in the present instance is cylindrical in form, and which is adapted to be rigidly secured to a flange on the work spindle (not shown) by a plurality of bolts 11 threaded into tapped bores 12 in the rear face 13 of the body.

The body 10 is cone shaped at its front edge to provide a beveled surface 14, and is formed with a cylindrical clearance chamber 15 in its front face or end, said chamber being centrally positioned with respect to the axis of rotation and being adapted to receive abrasive particles, dust, and coolant thrown off in the grinding operation. The clearance chamber 15 and the beveled surface 14 define an annular rim 16, which is formed with a plurality of radial clearance slots 17 for conducting away the refuse in the chamber 15.

Extending forwardly from opposite sides of the body 10 are two spaced arms or projections 18 the outer ends of which are connected or bridged by a front plate 19 having a central opening 20 extending therethrough. A hardened metal bushing 21 having an inner circular bearing or guide surface 22 concentrically located with respect to the axis of the chuck is tightly fitted within the opening 20, and is held against forward movement by an integral flange 23 formed at its inner end and engaging an annular notch 24 in the inner edge of the opening 20. The bushing 21 is formed with an annular notch or recess 25 in the flange 23 which is adapted to freely receive a work blank 26 of a slightly smaller diameter to approximately center the outer edge of said blank with the surface 22 of the bushing. The inner diameter of the bushing 21 is necessarily greater than that of the bore of the work blank to be ground. In accurately centering the bore of the work blank 26 with respect to the bushing 21, use is made of a centering plug 27, represented in dotted lines, which preferably comprises a sphere segment 28 mounted on a handle 29. When the plug 27 is inserted into the bushing 21, the spherical surface of the segment 28 engages the guide surface 22 and the bore of the blank 26 and brings them into axial alinement.

The rear portion of the body 10 is formed with a cylindrical chamber or recess 30 substantially larger in diameter and depth than the clearance chamber 15 and separated from the latter by a thin wall or web 31. The web 31 is provided with a threaded central aperture 32. The open end of the recess 30 is partially closed by a flat ring 33, the outer edge of which is retained in an annular notch 34 in the face 13 by a plurality of bolts 35. At its inner end, the recess 30 is formed with an annular groove 36, from opposite sides of which bores 37 extend through the walls of the body 10 in the rear of the arms 18.

Slidably mounted in a plurality of bores 38 extending through the annular rim 16 are a like number of clamping pins 39, the forward ends of which are adapted to engage the rear edge of the work blank 26 to hold the latter firmly in place against the bushing 21 and the rear ends of which extend into the recess 30. In the present instance I have shown eight clamping pins 39 uniformly spaced from each other at equal distances about the axis of the chuck, but any other desired number of pins arranged in any other suitable manner may be employed.

The clamping faces of the pins 39 are beveled at their outer edges, as indicated at 40, to facilitate the rapid insertion of the work blank 26 into chucking position. Each pin 39 is cylindrical in shape, and at its rear end is formed with a reduced shank or stem 41, thereby providing an annular shoulder 42 within the recess 30. A strong coil spring 43 for forcing the pin forward is positioned on each stem 41 and abuts at one end against the ring 33 and at the other end against the shoulder 42.

Means is provided for simultaneously moving the clamping pins 39 against the force of the springs 43 to admit or release a blank 26, and for limiting the independent movement of each pin 39. In the present instance this means comprises a disk 44 positioned within the chamber 30 and supported by a draw rod 44ª which is slidably mounted within the work or head stock spindle of the machine in a well known manner. The disk 44 is formed with a plurality of equally spaced radial slots 45 in its periphery, the sides of which freely engage flat surfaces 46 milled on opposite sides of each clamping pin 39 to prevent independent rotation of said pins about their axes. The milled surfaces 46 are slightly wider than the disk 44 to allow a limited independent axial movement of the pins 39.

The operation of the chuck is as follows: The disk 44 is drawn rearwardly, thereby moving the pins 39 simultaneously against the force of the springs 43 to increase the distance between the clamping faces of the pins and the bushing 21. A work blank 26 is positioned between the arms 18 with its forward edge fitting loosely within the annular notch 25 in the bushing 21. The notch 25 acts to approximately center the work blank 26 with respect to the axis of the chuck. If accurate centering is required, the centering plug 27 is inserted into the bushing 21 and the bore of the work piece. The disk 44 is now moved to its forward position, thereby moving the pins 39 into resilient engagement with the rear edge of the work blank 26.

The pins 39 retain the work blank 26 firmly against the bushing 21 throughout the machine operation. Irregularities in the rear edge or variations in the thickness of the work blank 26 are compensated for by independent movement of each pin allowed by the difference in width of the milled surfaces 46 and the disk 44, whereby a substantially uniformly distributed end pressure on the blank is obtained. After the machine operation has been completed, the pins 39 are again withdrawn, and the work blank 26 removed.

By holding the work blank in position with end pressure alone, lateral distortion of the walls due to gripping the outer peripheral surface is avoided. By providing self-adjusting means for applying a uniform end pressure, an equalized bearing over the entire end of the work blank is obtained. The work blank is thereby held firmly in place throughout the entire machine operation. Blanks with thin walls can be chucked and machined without being distorted. The chuck is simple and compact in construction. Work blanks can be quickly and accurately positioned and removed, thereby adapting the chuck particularly for quantity production in precision machine work.

The chuck can be made to accommodate different sizes of work without materially changing its design. Thus work of different thicknesses can be chucked by making the arms 18 longer or shorter. Work of different outside diameters can be taken care of by positioning the pins 39 at different distances from the center of the chuck and by forming the notch 25 in the bushing 21 with different diameters. For holes of varying diameters to be ground, bushings 21 with different sized bores can be provided.

I claim as my invention:

1. A chuck having, in combination, a body, forwardly extending arms formed on opposite sides of said body, a front plate secured to the outer ends of said arms, a bushing centrally mounted in said plate, a clearance chamber centrally formed in the front end of said body, a plurality of clamping pins slidably mounted in said body about said clearance chamber, spring means engaging said pins and normally tending to force the latter in a forward direction, and means engaging said pins for preventing independent rotation of the latter about their axes and for simultaneously moving said pins in an axial direction.

2. A chuck having, in combination, a body, a bushing supported at the front end of said body, a chamber formed in the rear end of said body, said bushing and said chamber being concentrically located with respect to the axis of said body, a plurality of pins extending from said chamber through said body, said pins being mounted for axial movement toward and from said bushing, spring means in said chamber for moving said pins in a forward direction, and disk means in said chamber having a lost motion connection with said pins for simultaneously moving them in an axial direction.

3. A chuck having, in combination, a body, forwardly extending arms on said body, a bushing supported by said arms in spaced relation to said body, clamping pins mounted in said body for axial movement toward or from said bushing, spring means for moving said pins independently of each other, and means for limiting the extent of such independent movements and for moving said pins simultaneously.

4. A chuck having, in combination, a body comprising two alined chambers separated by a web, a plurality of clamping members arranged in spaced relation and extending from one chamber through said body to engage the work, spring means in said last mentioned chamber engaging said clamping members, and a member having a slotted connection with said clamping members for controlling the position of the latter.

5. A chuck having, in combination, a chuck body, guide means supported at the front end of said body concentrically with respect to the axis thereof, said guide means being adapted to engage one end of the work blank, a plurality of spaced clamping means mounted in said body and adapted to engage the other end of the blank, one of said means being formed with a notch for centering said blank, spring means for moving said clamping means independently of each other, and a single means for simultaneously moving said clamping means relative to said guide means.

6. A chuck having, in combination, a body, guide means supported by said body, said guide means being adapted to engage one end of the work piece, and a plurality of spaced spring pressed means for exerting a uniformly distributed pressure upon the other side of said work piece, each of said last mentioned means having a limited independent movement.

7. A chuck having, in combination, a body, forwardly extending arms on said body, a bushing supported by said arms, an annular rim formed on the front face of said body, said rim having a plurality of radial clearance slots, and a plurality of spring pressed clamping members slidably extending through said rim for movement toward or from said bushing.

8. A chuck having, in combination, a body, an annular rim formed on the front face of said body and defining a central clearance chamber, clearance slots extending from said chamber through said rim, fixed means mounted in spaced relation in front of said rim, and spring pressed clamping means slidably mounted in said rim and arranged to cooperate with said fixed means for holding a work blank in place.

9. A chuck having, in combination, a body, a plurality of uniformly spaced clamping members mounted about the axis of said body, a plurality of individual spring means respectively engaging said members, said spring means being adapted to force said members resiliently against one end of a work blank, and a single means within said body for withdrawing said members from the position in which they are adapted to clamp said work blank.

10. A chuck having, in combination, a body having a cylindrical recess in its rear face, a ring partially closing said recess, a plurality of clamping pins slidably mounted in said body and having reduced shanks extending into said recess, a coil spring mounted on each shank with one end abutting against said ring and the other end engaging the pin, and a disk movably supported in said recess, said disk having a plurality of radial slots arranged to engage opposite sides of said pins.

11. A chuck having, in combination, a body formed with a recess in its rear face, a plurality of clamping pins mounted for axial movement in said body, a disk movably supported in said recess and having a lost motion connection with each of said pins, and spring means for independently actuating said pins to take up said lost motion.

12. A chuck having, in combination, a body, a plurality of clamping pins slidably mounted about the axis of said body, a stem on the rear end of each pin, a coil spring positioned on each stem with its opposite ends engaging the body and the pin respectively, and a disk engaging said pins, said disk allowing a limited independent movement of each of said pins.

13. A chuck having, in combination, a body formed with a recess in its rear face, a plurality of slidably mounted clamping members extending into said recess, said members having milled surfaces on their opposite sides, a member movably supported in said recess and having a plurality of slots arranged to engage said milled surfaces, and spring means in said recess for moving said pins in said slots.

14. A chuck having, in combination, a body, a clamping member slidably mounted in said body, said clamping member having a depression on one side, a movable member engaging said depression for positioning said clamping member, said movable member being less in width than said depression to allow a limited amount of independent movement between said members, and spring means engaging said clamping member for opposing said movement in one direction.

15. A chuck having, in combination, a body, a plurality of parallel clamping members slidably mounted in said body, a positioning means having a lost motion connection with said members for moving them simultaneously in either of two directions, and means opposing the movement of said members in one direction.

16. A chuck having, in combination, a body, a plurality of clamping members slidably mounted in said body, and a spring operated member movably mounted in said body and having a lost motion connection with said clamping members for holding the latter substantially in their operative or inoperative positions.

17. A chuck having, in combination, a body, a front plate, a work positioning means on said front plate, a clamping member slidably mounted in said body for engaging the work, a disk means having a lost motion connection with said clamping member, and spring means for moving said disk means and said clamping member to clamp the work in position.

18. A chuck comprising, in combination, a body having a rear chamber, a work positioning means, clamping means mounted in said body, an apertured rear plate partially closing said body, a plurality of spaced spring means mounted in said chamber between said clamping means and said rear plate for moving said clamping means to clamp the work in position, and a draw bar for moving said clamping means to release said work.

In testimony whereof, I have hereunto affixed my signature.

KEITH F. GALLIMORE.